United States Patent [19]
Goodhouse et al.

[11] 3,783,769
[45] Jan. 8, 1974

[54] COOKING COMPUTER MEANS

[75] Inventors: Carl J. Goodhouse, Litchfield; Robert Strachan, New Haven, both of Conn.

[73] Assignee: Robertshaw Controls Company, Richmond, Va.

[22] Filed: July 19, 1972

[21] Appl. No.: 273,134

Related U.S. Application Data

[62] Division of Ser. No. 112,132, Feb. 3, 1971, Pat. No. 3,688,978.

[52] U.S. Cl. ................................... 99/332, 99/343
[51] Int. Cl. ....................................... A47j 27/086
[58] Field of Search ................ 99/325, 327, 329, 99/332, 343; 219/489, 490, 492; 235/61 A

[56] References Cited
UNITED STATES PATENTS

| | | | |
|---|---|---|---|
| 2,663,786 | 12/1953 | Illian et al. | 99/332 UX |
| 2,838,646 | 6/1958 | Welch | 219/489 |
| 3,051,813 | 8/1962 | Busch et al. | 219/489 |
| 3,072,327 | 1/1963 | Perry | 235/61 A |
| 3,263,918 | 8/1966 | Beachler et al. | 235/61 A |
| 3,333,085 | 7/1967 | Colalillo | 219/489 X |
| 3,384,071 | 5/1968 | Body et al. | 126/197 |

*Primary Examiner*—Billy J. Wilhite
*Assistant Examiner*—Arthur O. Henderson
*Attorney*—Candor, Candor & Tassone

[57] ABSTRACT

A cooking computer for determining the cooking operation of a cooking apparatus, the computer having a stationary input means indicating selectable variables other than the weight of a meat item. The computer has a manually settable weight input means for indicating a single selected indicated weight applicable to all meat items and corresponding to the weight of a particular meat item to be cooked, the weight input means being settable in relation to a selected variable of the stationary input means. The computer has a time period output means operatively associated with the input means to provide as an output a cooking time period for the particular meat item computed as a function from the selection of both of the input means according to a cooking formula.

10 Claims, 12 Drawing Figures

PATENTED JAN 8 1974

PATENTED JAN 8 1974
3,783,769
SHEET 4 OF 4
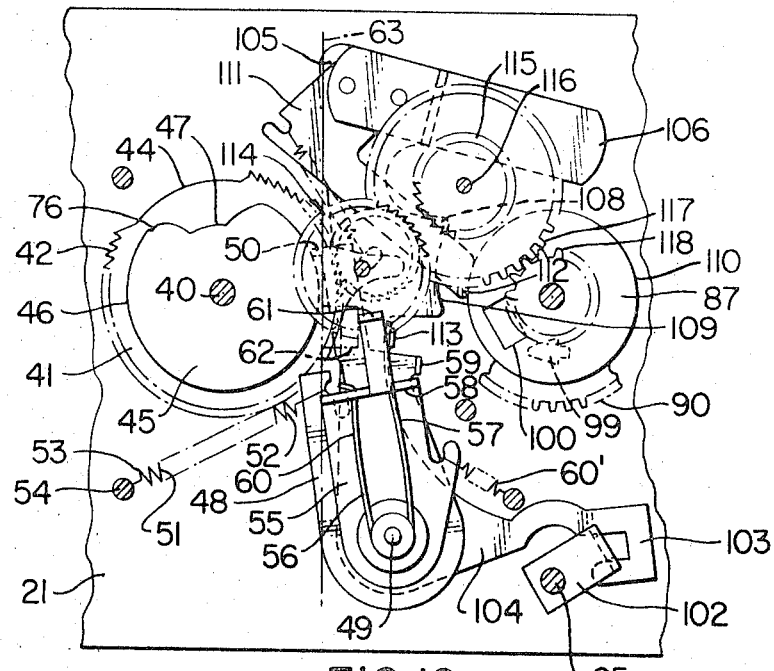
FIG.10
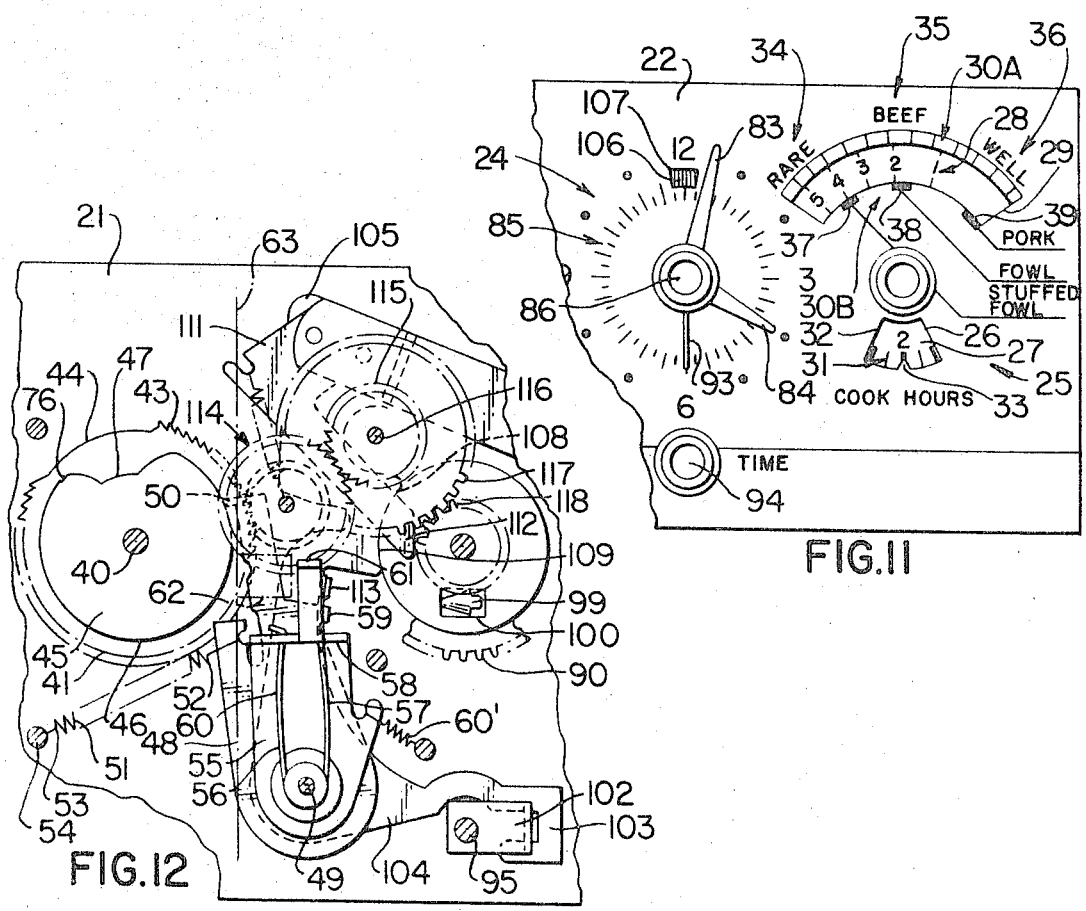
FIG.11
FIG.12

COOKING COMPUTER MEANS

This is a division, of application Ser. No. 112,132, filed Feb. 3, 1971, now U.S. Pat. No. 3,688,978.

This application relates to a cooking computer for determining the cooking operation of a cooking apparatus as well as a cooking apparatus having such a computer device.

It is well known from the copending Pat. application of James R. Willson, Ser. No. 47,345, filed June 18, 1970, now abandoned and its recently filed continuation-in-part application Ser. No. 111,727, filed Feb. 1, 1971, now U.S. Pat. No. 3,731,059, that a most accurate cooking of various meat items can be provided by a cooking formula for cooking all types of meat by utilizing only two variables, namely, the weight of a particular meat item to be cooked and the desired degree of doneness of that meat item whether the desired degree of doneness relates to a range of doneness conditions for a particular meat item or to meat items of different types.

For example, such cooking formula when being utilized in connection with gaseous fuel burning cooking apparatus provides the cooking time period in minutes as being equal to 70 times the square root of the weight of the meat item plus or minus a $K$ factor with the cooking temperature being approximately 325° F. and with the $K$ factor being the selected degree of doneness for the particular meat item. For electrically heated cooking apparatus, the cooking formula provides the cooking time period in minutes as being equal to 40 times the square root of the weight of the meat item plus or minus a $K$ factor for the desired degree of doneness of the particular meat item and with the cooking temperature being approximately 325° F.

The results of the above formula is in minutes from the time the cooking apparatus begins to cook the meat item to the time that the meat item is ready to be removed from the oven at the termination or zero position of such completed time period. However, during such cooking operation, the high cooking temperature (325° F.) is terminated at a set point during the computed cooking time period so that the temperature in the oven, while drifting down from the high cooking temperature to a holding and non-cooking low temperature, will continue to cook the meat item until the oven reaches the hold temperature of the oven which is the zero or end of the computed cooking time period. In this manner, the cooked meat item will be at the desired degree of doneness so that if the housewife does not remove the meat item at this particular time, the oven will maintain the meat item at a palatable temperature which is a non-cooking temperature so that the cooked meat item can be removed from the oven any time after the elapsed and computed cooking time period.

For example, it has been found that for gaseous fuel burning ovens, the automatic cut back time for the oven temperature to the end of a computed cooking time period can be approximately 45 minutes whereas in electrically heated ovens such automatic cut back time can be approximately 60 minutes.

In the computer structure of the aforementioned copending patent application, the housewife is required to manually set both cooking variables of the cooking formula into the computer by separate input means with the computer subsequently providing a visual indication of the computed cooking time period. Such a computer can be utilized by itself or in combination with a cooking apparatus to automatically cause the cooking apparatus to cook the food at the computed cooking time period if the housewife so desires. However, the housewife must insert into the computer a weight selection by a manually settable input means as well as operate another manually settable input means for inserting into the computer the desired degree of doneness of the particular meat item.

It is well known that the more knobs or other manual selector means provided on a cooking apparatus for a housewife to operate in order to provide a cooking function tends to cause the housewife not to use any of such automatic devices because she is afraid of not following a proper sequence for setting the automatic controls of a cooking apparatus, particularly when she is afraid of ruining an expensive meat roast or the like.

Therefore, one of the features of this invention is to provide a cooking computer of the above type wherein the housewife need only manually insert one input means of the aforementioned cooking formula into the computer to provide for the computed cooking time period for a particular meat item whereby the operation of such computer by the housewife is a relatively simple operation while the computer automatically provides its accurate output function as fully described in the aforementioned copending patent applications.

In particular, one embodiment of this invention provides a cooking computer for determining the cooking operation of a cooking apparatus, the computer having a stationary input means indicating selectable variables other than the weight of a meat item. The computer has a manually settable weight input means for indicating a single selected indicated weight applicable to all meat items and corresponding to the weight of the particular meat item to be cooked. The weight input means is settable in relation to a visually selected variable of the stationary input means. The computer has a time period output means operatively associated with the input means to provide as an output a cooking time period for the particular meat item computed as a function from the selection of both of the input means in the cooking formula of the aforementioned patent aplications.

Thus, it can be seen that the housewife or the like need only manually insert into the computer of this invention a setting corresponding to the weight of the particular meat item to be cooked while merely visually setting such weight input means in relation to a desired degree of doneness input means that is stationary and non-manually settable, the computer interpreting such relationship in accordance with the aforementioned cooking formula to provide as an output the cooking time period for that particular meat item. The output means of the computer can comprise a visual indication of the computed cooking time period required and/or comprising the automatic operation of a cooking apparatus cooking such meat item for such computed cooking time period.

Accordingly, it is an object of this invention to provide an improved cooking computer having one or more of the novel features set forth above or hereinafter shown or described.

Another object of this invention is to provide an improved cooking apparatus utilizing the cooking computer means of this invention.

Other objects, uses and advantages of this invention are apparent from a reading of this description which proceeds with reference to the accompanying drawings forming a part thereof and wherein:

FIG. 10 is a view similar to FIG. 9 and illustrates the cooking computer after the housewife has inserted the weight input into the computer to automatically set the cooking hours once the cooking period has been reached by the control device.

FIG. 11 is a fragmentary, front view of the computer illustrating the set condition of the computer after the weight input means has been inserted therein in the manner illustrated in FIG. 10.

FIG. 12 is a view similar to FIG. 10 and illustrates the computer during the cooking operation.

Figure 1:
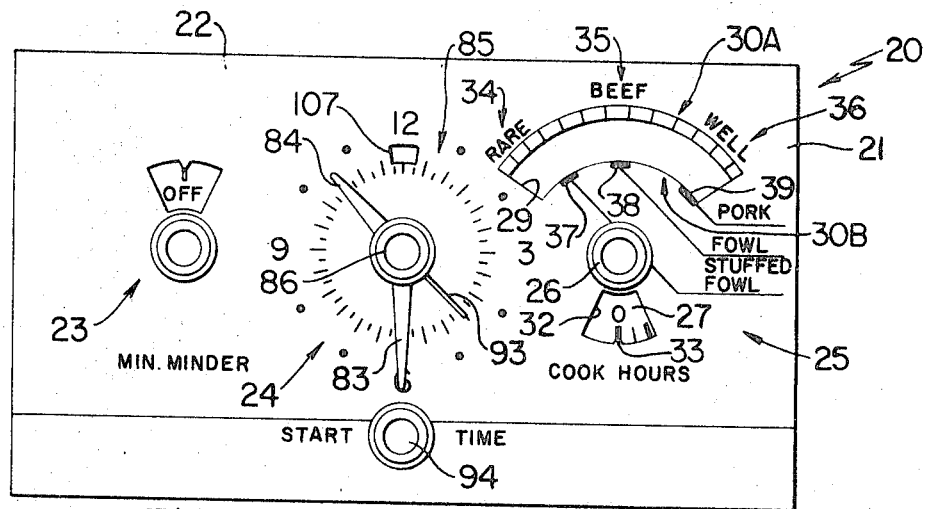
FIG. 1 is a front view of one embodiment of the cooking computer of this invention.

While the various features of this invention are hereinafter described and illustrated as being particularly adaptable for operating with an automatic clock arrangement for oven control, it is to be understood that the various features of this invention can be utilized singly or in any combination thereof to provide cooking computer means for other control means or merely by itself for information purposes and the like, if desired.

Therefore, this invention is not to be limited to only the embodiment illustrated in the drawings, because the drawings are merely utilized to illustrate one of the wide variety of uses of this invention.

Referring now to FIG. 1, the computer device of this invention is generally indicated by the reference numeral 20 and comprises a conventional frame structure 21 having a front wall 22 providing a control panel for the computer device 20 wherein the control panel 22 has the conventional bell ringing settable timer 23 that does not form any part of this invention, a timer operated clock means 24 that is conventional in the art except that the same is being utilized in combination with the computer means of this invention in a unique manner as will be apparent hereinafter to control a cooking apparatus and the computer 25 of this invention hereinafter described.

Figure 3:
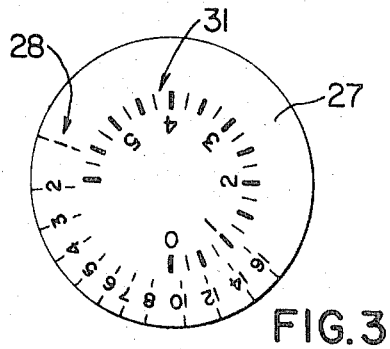
FIG. 3 is a front view of the computer disc utilized for the computer of FIG. 1.

In general, the computer portion 25 of the computer device 20 includes a control knob 26 which the housewife can rotate to cause a disc 27, FIG. 3, to position a weight scale 28 thereon so as to be viewable through an arcuate window means 29 in the front wall 22. In this manner the housewife can set a weight input means into the computer 25 in relation to a stationary scale or input means 30A and 30B respectively disposed on opposite sides of the arcuate window 29 so that a computed cooking time period scale 31 on the disc 27 will be viewable at another window means 32 of the front wall 22. A pointer 33 of the front wall 22 at the window 32 will indicate on the time scale 31 the computed cooking time period for a particular weight of meat as set against a stationary input means for the desired degree of doneness thereof as will be apparent hereinafter.

The upper stationary scale 30A on the front wall 22 of the computer device 20 is provided for beef roasts and extends from a rare setting 34 through a medium range 35 to a well done setting 36 with the scale 30A being suitably colored from left to right with red hues conforming to the degree of doneness that the interior of the meat will have for a particular degree of doneness setting against the scale 30A. The scale 30B is provided for the degree of doneness of other meat types. Since other meat types each are normally cooked to the same degree of doneness for that particular type of meat, the scale 30B includes a single setting 37 for stuffed fowl, a single setting 38 for unstuffed fowl and a single setting 39 for well done pork. Of course, a range of settings for each different type of meat could be provided, if desired.

As previously stated, the disc 27 carrying the weight scale 28 and time scale 31 is rotatable relative to the front wall 22 of the computer device 20 by the control knob 26, the disc 27 being carried on a shaft means 40 to be rotated thereby when the knob 26 is rotated. The shaft 40 is rotatably mounted to the frame means 21 with the shaft means 40 carrying a gear disc 41 having a first portion 42 provided with gear teeth 43 about the outer periphery thereof except at a smooth untoothed portion 44 thereof for a purpose hereinafter described and comprising an inwardly offset cam portion 45 having a portion thereof defining a substantially circular cam surface 46 interrupted by an inwardly offset cam area 47 for a purpose hereinafter described. The offset area 47 is located adjacent the smooth surface 44 of the gear portion 42 for a purpose hereinafter described.

Figure 2:
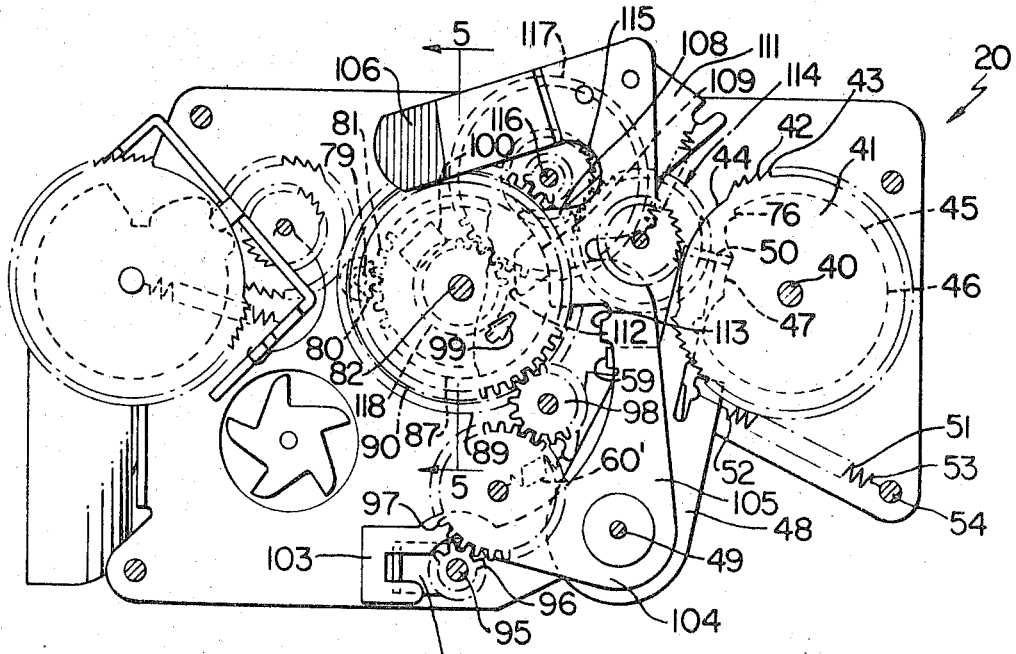
FIG. 2 is a rear view of the cooking computer of FIG. 1 with certain structure thereof removed.
Figure 8:
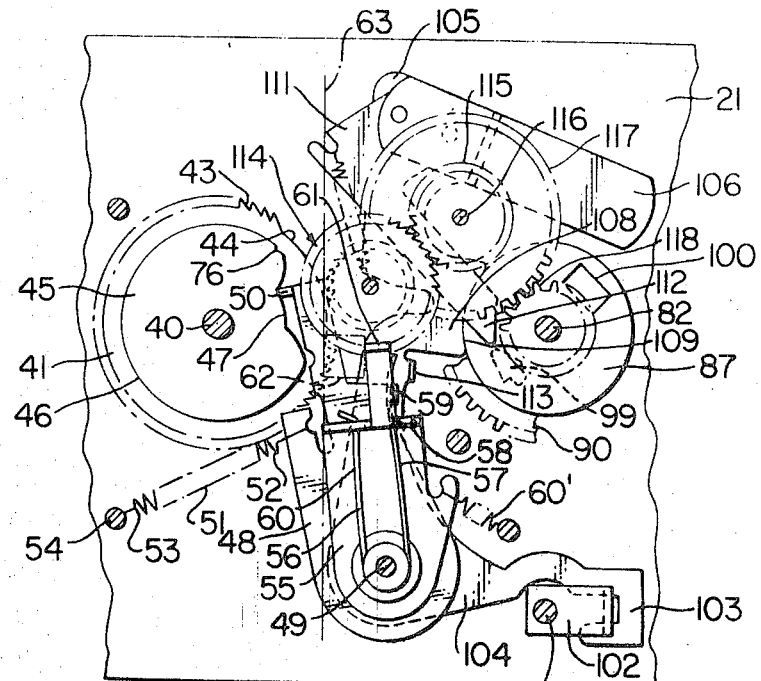
FIG. 8 is a fragmentary view similar to FIG. 2 with certain structure thereof removed and illustrating the normal setting of the cooking computer components before a selected cooking operation is set therein.
Figure 9:
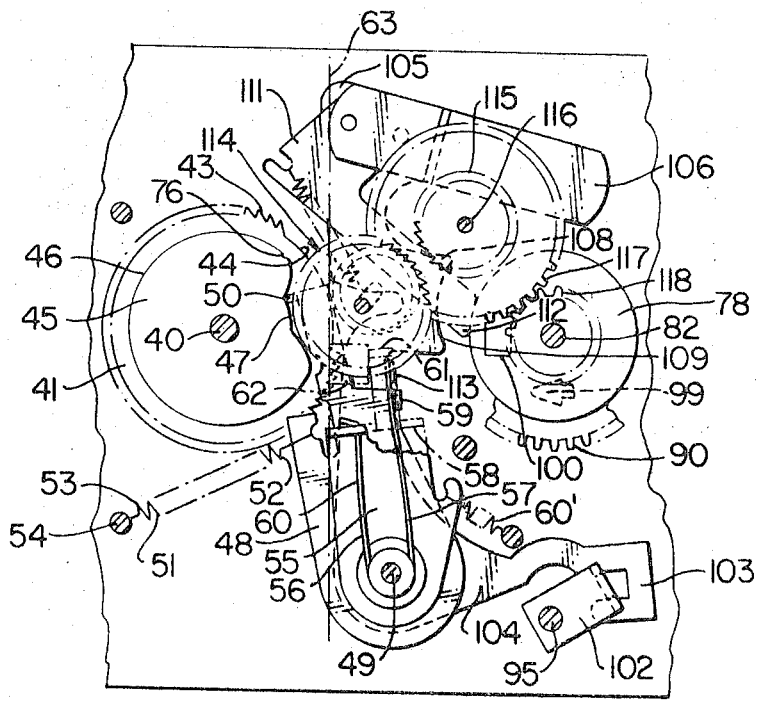
FIG. 9 is a view similar to FIG. 8 and illustrates the structure when the housewife has set the computer to operate a cooking apparatus at a set point or start time in the future.

A lever 48 is pivotally mounted to the frame means by a pivot pin 49 and has a tongue or ear 50 engageable against the cam surface 46,47 of the disc portion 45 in the manner illustrated in FIGS. 2, 8, 9. 10 and 12 of the drawings with the ear 50 tending to follow the contour 46,47 of the disc 41 by the force of a tension spring 51 having one end 52 interconnected to the lever 48 and the other end 53 interconnected to a frame pin 54. The pivot pin 49 carries a plunger actuator lever 55 also pivotally mounted to the pin 49 and normally tending to follow movement of the lever 48 through a hair pin spring arrangement 56 which has one leg 57 passing through a slotted part 58 of the lever 55 and bearing against an outwardly directed tang 59 of the lever 48 while the other leg 60 of the spring 56 passes through the slotted part 58 of the lever 55 at the other side thereof. A tension spring 60' tends to cause clockwise movement of the lever 55 in the manner illustrated in FIG. 8 except that the hair spring 56 when having the leg 57 engaging against the tang 59 of the lever 48 overcomes the force of the tension spring 60' so that the lever 55 tends to follow the movement of the lever 48 as the same is cammed by the cam disc 41 as will be apparent hereinafter.

Figure 4:
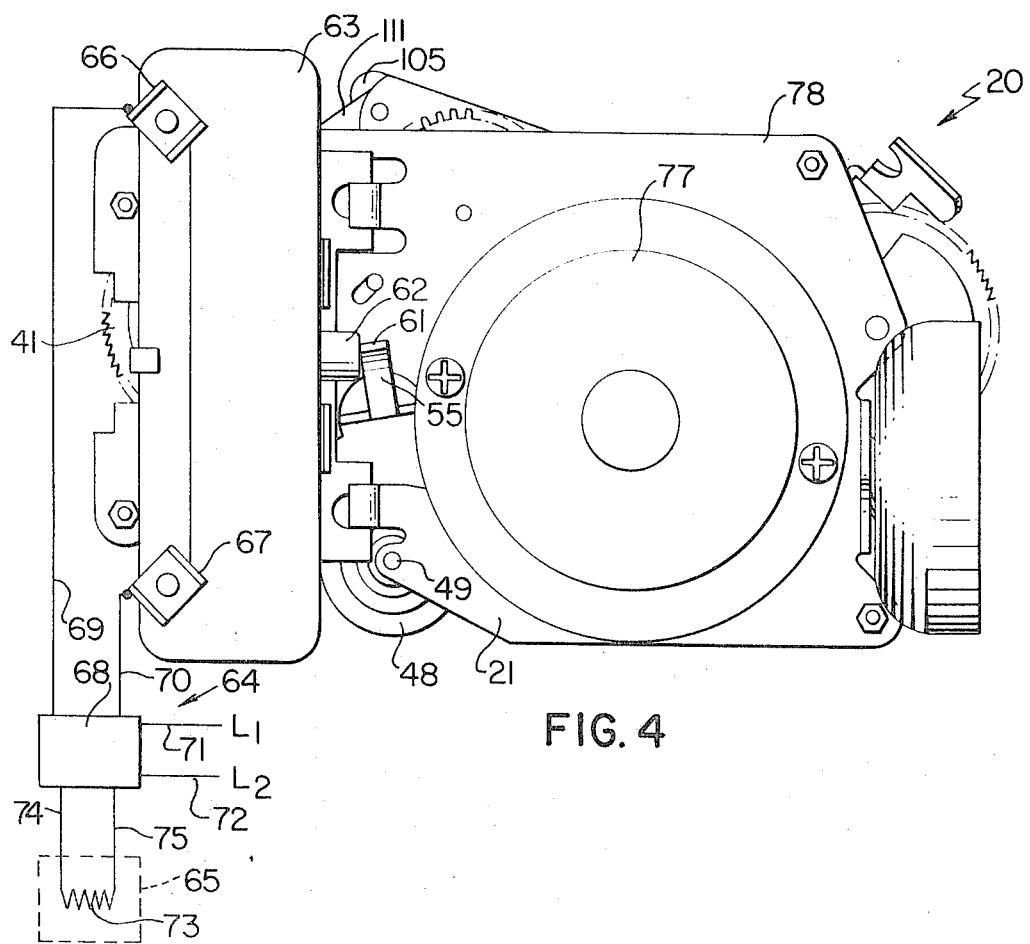
FIG. 4 is a rear view of the computer of FIG. 1, similar to FIG. 2, except that the rear structure is not removed, FIG. 4 schematically illustrating the computer in combination with a cooking apparatus.

The lever 55 has a plunger actuator 61 for engaging against a plunger 62, FIG. 4, of an electrical switch 63 carried on the rear of the frame means 21 of the computer device 20 with the electrical switch 63 being adapted to be interconnected into the control circuit 64 of a cooking apparatus 65 in the manner schematically illustrated in FIG. 4.

In particular, the electrical switch 63 has a pair of terminals 66 and 67 adapted to be electrically interconnected together when the plunger 62 is in its full out position as illustrated in phantom lines in FIG. 12 and to disconnect the electrical connection between the terminals 66 and 67 when the plunger 62 is in its in position as illustrated in FIGS. 4, 8, 9, and 10.

The terminals 66 and 67 are respectively electrically interconnected to a control device 68 by leads 69 and 70 with the control device 68 being interconnected to power source leads $L_1$ and $L_2$ by suitable leads 71 and 72. The electrical heating element 73 for the cooking apparatus 65 is interconnected to the control device 68 by lead means 74 and 75. Of course, it is to be understood that the heating element 73 for the cooking device 65 could be a gas burner with the control device 68 interconnecting and disconnecting a source of fuel from such burner in the same manner as the same interconnects and disconnects the power source leads $L_1$ and $L_2$ from the heating element 73.

Nevertheless, it is to be understood that the control device 68 does not cause the heating means 73 for the oven 65 to operate under the control of a thermostatic means until the plunger 62 of the switch 63 is in its outermost position when the control device 68 is set for an automatic cooking operation as will be apparent hereinafter. When the control device 68 is set for an automatic cooking operation to be controlled by the computer means 25 of this invention, the control device 68 automatically sets the thermostatic means thereof to maintain the temperature in the oven at 325° in accordance with the teachings of the cooking formula of the aforementioned copending patent applications.

Of course, if it is desired to operate the oven 65 independently of the computer device 20 of this invention, the control device 68 is set in a manual position thereof so that the control of the heater means 73 is independent of the operation of the switch means 63 of the computer 20. However, if desired, the computer device 20 can be so constructed that the control knob 26 can set the disc 41 at a "manual" position thereof wherein the ear 50 of the lever 48 is set in a notch 76 of the disc 41 to permit the plunger 62 to be set in its outermost position and remain in such position until the disc 41 is manually turned out of its "manual" position.

The frame means 21 of the computer controller device 20 carries a conventional electrically operated timer motor 77 on a rear plate 78 thereof with the timer motor 77 having an output shaft 79, FIG. 2, for continuously driving a timer pinion gear 80 disposed in meshing relation with a gear 81 mounted to a shaft means 82 carried by the frame means 21 with the shaft means 82 carrying the minute and hour hands 83 and 84 of the clock 24 so that the hands 83 and 84 will indicate the actual time of day in relation to a clock face means 85 disposed on the front wall 22 of the computer controller 20. The hands 83 and 84 are adapted to be set relative to the clock face 85 by a conventional knob structure 86 on the shaft means 82 in a manner well known in the art.

Figure 5:
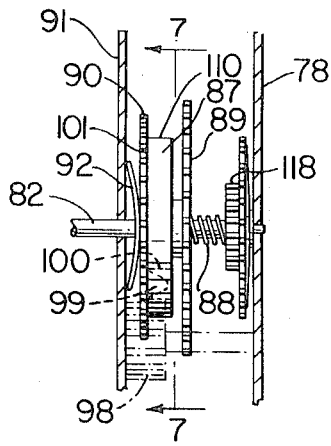
FIG. 5 is a fragmentary, cross-sectional view taken substantially on line 5—5 of FIG. 2.
Figure 6:
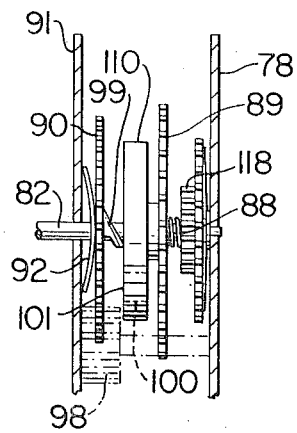
FIG. 6 is a view similar to FIG. 5 and illustrates the structure in another operating position thereof.
Figure 7:
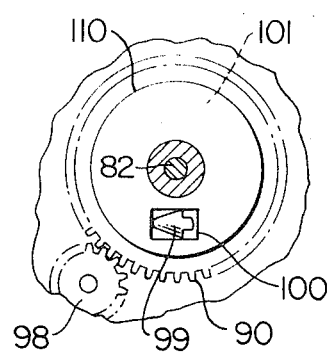
FIG. 7 is a fragmentary, cross-sectional view taken on line 7—7 of FIG. 5.

As illustrated in FIGS. 2 and 5, a disc 87 is splined on the shaft 82 and is urged to the left in FIG. 5 by a compression spring 88, the disc 87 carrying a gear 89 to rotate in unison with the disc 87 and be axially movable therewith. Another gear 90 is disposed for rotation on the shaft 82 relative to the shaft 82 and is disposed between a frame plate 91 of the frame 21 and the axially movable disc 87 while being urged toward the disc 87 by a load, washer-like spring 92. The rotational position of gear wheel 90 relative to the shaft 82 is set by the setting of the start to cook hand 93 of the clock means 24 as the hand 93 rotates in unison with the disc 87. The gear 90 and, thus, the start to cook hand 93 is set by a control knob 94 on the front wall 22 of the computer 20 and operates a shaft 95 carrying a gear 96 that is interconnected to the gear 90 by intermediate gears 97 and 98 whereby moving the start knob 94 will move the gear 90. The gear 90 has an outwardly directed cam part 99 which is adapted to ride in or be received in a recess or hole 100 on the face 101 of the disc 87 in the manner illustrated in FIGS. 5 and 7. However, when the disc 90 is rotated relative to the disc 87 by the knob 94, the member 99 cams the disc 87 axially to the right as illustrated in FIG. 6 whereby the disc 87 and gear 89 are moved in opposition to the force of the compression spring 88 as illustrated in FIG. 6. However, when the hour and minute hands 83 and 84 reach the same time position as the time setting position of the start time hand 93, the recess 100 in the disc 87 is in registry with the tank 99 of the gear 90 so that the disc 87 will axially move from the position illustrated in FIG. 6 to the position illustrated in FIG. 5 whenever the hands 83 and 84 of the clock 24 correspond to the start time setting of the hand 93 for a purpose that will be apparent hereinafter.

As the start time shaft 95 is rotated by the knob 94, the shaft 95 also rotates a lever 102 therewith which acts against a leg 103 of an L-shaped lever 104 pivoted to the frame means 21 by the pivot pin 49 that carries the levers 48 and 55 previously described. The L-shaped arm 104 has the other leg 105 thereof provided with a flag or indicating area 106 which when pivoted from the position illustrated in FIG. 2 to the position illustrated in FIG. 9 will be viewable through a window means 107 in the front wall 22 of the computer controller 20 as illustrated in FIG. 11 to indicate that a start time has been set by the knob 94 to cause a timed cooking operation to begin when the start time is reached by the clock hands 83 and 84 as will be apparent hereinafter. The arm 105 of the L-shaped lever 104 also has a cam tongue 108 provided with an arcuate surface 109 adapted to abut against the peripheral edge 110 of the disc 87 so as to position the lever 104 in its normal pivoted position as illustrated in FIG. 2. However, the lever 104 also carries an arm 111 which has an end 112 adapted to abut against the smooth peripheral surface 110 of the disc 87 when the disc 87 has been moved axially to the right in the manner illustrated in FIG. 6 whereby as long as the disc 87 has been cammed away from the gear 90 by the tang 99 thereof, the arm 104 will be held in its pivoted position as illustrated in FIG. 9 by the end 112 of the arm 111 and such movement of the arm 104 causes a tang 113 on the arm 105 to engage against the leg 57 of the spring 56 for the lever 55 and move the lever 55 to the left as illustrated in FIG. 9 to maintain the plunger actuator 61 of the lever 55 in position to maintain the switch plunger 62 for the switch 63 in its "in" position even though the lever 48 is subsequently cammed to the right in FIG. 10 by the disc 41 so as to move its tang 59 away from the spring 57 as illustrated in FIG. 10.

The movement of the arm 104 to its time setting position from the position illustrated in FIG. 8 to the position illustrated in FIG. 9 also causes the pivoting of a drive wheel 114 out of meshing relation with a drive wheel 115 on the output shaft 116 which shaft 116 is normally driven by a timer gear 117 disposed in meshing relation with the timer gear 118 on the main shaft 82. In particular, the gear means 114 has its shaft tiltably mounted to the frame plate 78 with such shaft being interconnected to the arm 105 by a tension spring to cause the gear means 114 to tilt in relation to movement of the arm 105.

The tiltable gear 114 when disposed in meshing relation with the gear means 115 is adapted to be disposed in meshing relation with the gear teeth means 43 on the disc 41 to rotate the same when the gear teeth 43 are disposed in a position to be in meshing relation with the gear means 114. However, when the gear means 114 is tilted by the arm 104 in the manner illustrated in FIG. 9 and FIG. 10, even though the gear 115 is being driven by the timer motor 77 through the gear train previously described, the wheel 41 will not be rotated therewith until the pivotal gear 114 is moved back to the position illustrated in FIG. 12 where the same is in meshing relation with the gear 116 so as to rotate the gear wheel 41 through the gear teeth 43 thereof as illustrated and for a purpose hereinafter described.

As previously stated, the timer motor 77 and the drive mechanism therefor for causing the operation of the plunger 62 of the switch 63 to be moved to its out position at a particular set start time as set by the hand 93 under the control of the knob 94 and to remain in such out position until a preselected number of cooking hours has been completed wherein the plunger 62 is moved back to its inward position by the arm 55, is well known structure manufactured by the assignee of this application. In particular, such well known structure is designated as 651,670 and 675 Series Timers produced by the Lux Time Division of Robertshaw Controls Company and reference is made thereto for further details of the structure and operation of this structure. However, the features of this invention are the converting of such mechanism to provide for an automatic cooking operation as computed by the aforementioned cooking formulas so as to provide an accurate cooking operation for the housewife or the like wherein the housewife merely only has to insert one meat variable in the computer portion 25 of this invention which provides an unique arrangement, the operation of which will now be described.

Assuming that the computer controller 20 is disposed in the position illustrated in FIG. 1 wherein the start time knob 94 has not been moved to the desired start position and the computer 25 has not been set in any position thereof for a desired meat item, the housewife has decided that she wants to cook a 5 lb. beef roast with a doneness of rare roast beef.

The housewife first rotates the knob 26 of the computer 25 so that the weight scale 28 of the disc 27 will position the number 5 adjacent the desired degree of rareness on the stationary scale 30A in the manner illustrated in FIG. 11 whereby the housewife will then look at the window 27 of the front wall 22 and see that the indicator 33 is indicating on the time scale 31 of the disc 27 that the 5 lb. beef roast can be taken from the oven any time after 2 hours from the start of the cooking time whereby the housewife will know that the beef roast can be removed from the oven any time after 8 o'clock if she starts the cooking operation at 6 o'clock.

Accordingly, the housewife then turns the knob 94 in the proper direction to cause the start hand 93 to move from the position illustrated in FIG. 1 to the position illustrated in FIG. 11 with such rotation of the knob 94 not only setting the hand 93 at the start position of 6 o'clock, but also causing the arm 104 to be pivoted from the position illustrated in FIG. 8 to the position illustrated in FIG. 9 to hold the lever 55 in its plunger "in" position by the tang 113 thereof operating on the arm 57 of the spring 56 as well as tilting the gear means 114 out of meshing relation with the gear 116 as previously described.

Alternately, the housewife can set the start time knob 94 before the housewife operates the computer 25 in the manner illustrated in FIG. 11 to determine that the 5 lb. beef roast will be done in a rare condition thereof after being cooked 2 hours from the desired start time. Thus, it can be seen that it makes no difference which knob 26 or 94 is operated before the other knob thereof, the important feature being that the computer 25 not only indicates the number of cooking hours required for a particular weight setting of a particular meat item in relation to a desired degree of doneness thereof, but will cause such cooking time period to automatically take place from a desired starting time.

With both knobs 94 and 26 now set in the position illustrated in FIG. 11, it can be seen from FIG. 10 that the disc 41 has been set by the knob 26 to a rotational position thereof so that the gear teeth 43 will be in register with the gear means 114 when the gear means 114 is moved or tilted back into meshing relation with the gear means 115 and such condition will only happen when the lever means 104 moves back to its unpivoted position as illustrated in FIG. 12 by the disc 87 having its recess 100 aligned with the tang 99 on the gear 90 when the actual time reaches the start time setting of the hand 93 in the manner previously described. At this time, the disc 87 is moved back to the left in the manner illustrated in FIG. 5 as the tang 99 is aligned with the recess 100 thereof, such movement of the disc 87 causing the arm 104 to move to the position illustrated in FIG. 12 whereby the lever 55 is adapted to move to the right under the force of the spring 56 so that the plunger 62 of the switch 63 is moved outwardly and the control device 68 can now operate the heating means 73 of the oven 65 to cause the heating means 73 to maintain the oven 65 at 325° F. as long as the plunger 62 of the switch 63 is in its out position. The plunger 62 of the switch 63 will be in its out position during a certain portion of the computed cooking time period as originally viewed through the window 27 of the controller 20 and in the example given was for 2 hours.

However, slightly before the 2 hour period is reached, the inward part 87 of the cam surface 46 of the disc 41 comes into registration with the ear 50 of the lever 48 so that the same rides inwardly in the manner illustrated in FIG. 8 under the force of the spring 51 whereby the tang 59 on the lever 48 moves the lever 55 to the left in FIG. 8 to again depress the plunger 62 of the switch 63 and terminate the operation of the heating means 73 for the oven 65.

As previously stated, this automatic cut back from cooking temperature for gaseous fuel burning apparatus is approximately 45 minutes from the end of the computed cooking time period and for electrically heated ovens is approximately 60 minutes from the end of the computed cooking time period so that during the drifting down of the temperature of the oven 65 from the cooking temperature of 325° to a holding and noncooking temperature thereof, such as 170° F., the meat in the oven 65 will be continuously cooked so at the end of the cooking time period when the dial 27 indicates zero cooking hours in the window 32, the meat item will be at the doneness that has been previously selected on the scale 30A of the computer 25 in the manner previously described and in accordance with the cooking formula of the aforementioned patent applications.

Therefore, it can be seen that the computer controller 20 of this invention automatically indicates to the housewife or the like what cooking time period is required for a particular meat item by permitting the housewife to simply set the weight of the particular meat item by the knob 26 in alignable relation with the desired degree of doneness on the stationary scale 30A or to the particular meat type on the stationary meat time scale 30B whereby the computer 25 provides as an output not only the computed number of cooking hours required for such a meat item, but also sets the disc 41 to operate in combination with the computer controller 20 the cooking apparatus 65 to automatically cook such food for that computed time period at any start time as set by the control knob 94 in an automatic manner.

It is to be understood that during the automatic cooking operation as provided by the computer 25 of this invention, once the cooking operation starts in the oven 65, the rotation of the disc 41 back to the position illustrated in FIG. 8 from the position illustrated in FIG. 12 causes the dial 27 to rotate in unison therewith so that the housewife can look at the window 32 and see how much cooking time is remaining before the meat item will be properly cooked.

Accordingly, it can be seen that this invention not only provides an improved cooking computer having many novel features as previously set forth, but also this invention provides an improved cooking apparatus by utilizing such a computer for controlling the operation thereof.

While the form of the invention now preferred has been illustrated and described as required by the patent statutes, other forms may be utilized all coming within the scope of the claims which follow.

We claim:

1. A cooking apparatus having a computer-controller device for determining and controlling the cooking operation of said cooking apparatus, said device having a stationary input means indicating selectable variables other than the weight of a meat item, said device having a manually settable weight input means for indicating a single selected indicated weight applicable to all meat items and corresponding to the weight of a particular meat item to be cooked, said weight input means being settable in relation to a selected variable of said stationary input means, said device having a time period output means operatively associated with said input means to provide as an output a cooking time period for said particular meat item computed as a function from the selection of both of said input means, said device having means operatively associated with said time period output means and said cooking apparatus to operate said cooking apparatus for said computed time period.

2. A cooking apparatus as set forth in claim 1 wherein said device has means visually indicating said computed cooking time period.

3. A cooking apparatus as set forth in claim 1 wherein said stationary input means indicates a variable of meat cooking doneness.

4. A cooking apparatus as set forth in claim 1 wherein said stationary input means indicates a variable of meat type.

5. A cooking apparatus as set forth in claim 1 wherein said stationary input means indicates a variable of meat cooking doneness and a variable of meat type.

6. A cooking apparatus as set forth in claim 1 wherein said stationary input means comprises a stationary scale, said weight input means comprising a movable scale adjacent said stationary scale to be selectably alignable therewith.

7. A cooking apparatus as set forth in claim 6 wherein said time period output means comprises means for visually indicating said computed cooking time period.

8. A cooking apparatus as set forth in claim 7 wherein said means for visually indicating said computed cooking time period comprises a movable scale remote from said stationary scale.

9. A cooking apparatus as set forth in claim 8 wherein said computer has a movable member, said movable scale of said weight input means and said movable scale of said time period output means being carried by said movable member.

10. A cooking apparatus as set forth in claim 9 wherein said device has another member carrying said stationary scale and having a first opening means adjacent said stationary scale and a second opening means remote from said stationary scale, said movable member being movable relative to said other member and having said movable scale of said weight input means and said movable scale of said time period output means respectively viewable through said first and second opening means of said other member.

* * * * *